Oct. 13, 1931.   B. KISS   1,826,938
STABILIZING DEVICE FOR AIRCRAFT
Filed Oct. 2, 1929   2 Sheets-Sheet 1
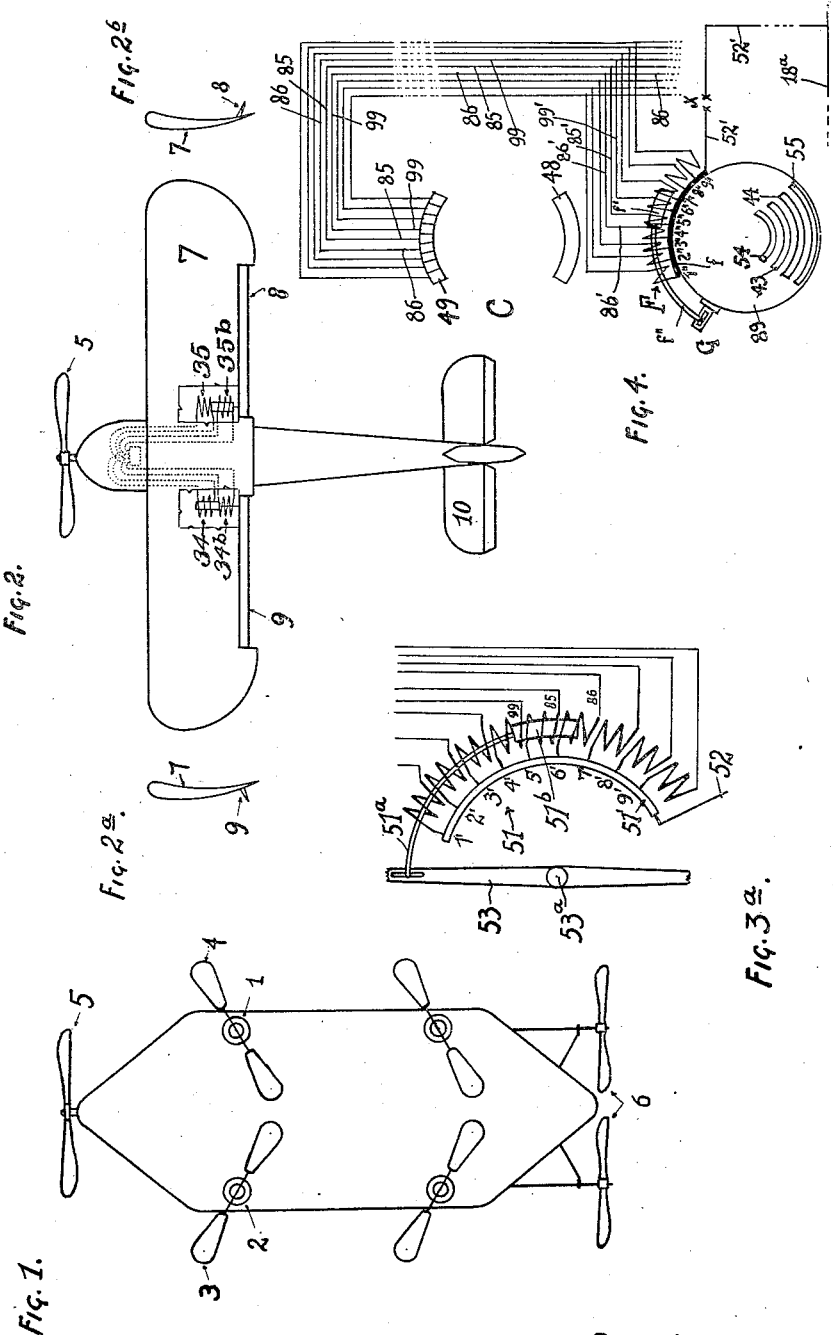
BELA KISS,
INVENTOR,
By: Julian F. Wirtel,
his attorney.

Oct. 13, 1931.  B. KISS  1,826,938
STABILIZING DEVICE FOR AIRCRAFT
Filed Oct. 2, 1929   2 Sheets-Sheet 2

BELA KISS,
INVENTOR,
By: Julian J. Wittal,
his attorney.

Patented Oct. 13, 1931

1,826,938

UNITED STATES PATENT OFFICE

BÉLA KISS, OF NEW YORK, N. Y.

STABILIZING DEVICE FOR AIRCRAFT

Application filed October 2, 1929. Serial No. 396,630.

This invention relates to stabilizing and adjusting devices for aircraft and has for its main object to provide a device and arrangement primarily in helicopters, but in aircraft of other types as well, whereby any inclination of the aircraft about its longitudinal or transverse axes will be automatically counteracted and the aircraft returned to its normal horizontal position, while at the same time the aircraft will also be automatically kept at a desired height set by its operator, the controls of the altitude cooperating with those of the even position of the aircraft.

Other objects of my invention will be apparent as the specification of the same proceeds, and some of these are: to provide automatic controls of the character mentioned hereinbefore which are quick and reliable in action, efficient, simple in construction, which may be attached to any present contruction of helicopters, aeroplanes and the like, by influencing the operation of their motors in a simple manner, and the action of which may be strengthened or weakened and generally influenced and adjusted in a simple manner and at any time according to the desire and judgement of the operator.

This invention therefore primarily relates to an arrangement for the stabilizing of airships of the rigid type which are provided not only with propeller screws, but also with helicopter screws, and wherein the returning of the airship into a horizontal position after it has become inclined about one main axis (longitudinal or transverse) is effected by virtue of the fact that in the event of such inclinations occurring the helicopter screws in question are automatically driven at a higher speed of revolution.

According to the invention throttle valves are inserted for this purpose in the fuel supply pipe of the driving motors of the lifting screws, the said throttle valves being controlled by electrical positioning devices, the strength of current in the circuit of the electrical positioning devices varying according to pendulum-like regulating switches, the position of which depend upon the inclination of the airship. There will be preferably provided on the airship two electrical regulating switches influenced by gravity, one of which is arranged in the central longitudinal vertical plane of the airship and the other in the central transverse vertical plane, so that the first regulating switch is shifted out of its normal position in the event of inclinations of the airship about the horizontal transverse axis, and the second in the event of inclination of the airship about the horizontal longitudinal axis. The deviation of the regulating switches being proportional to the inclination of the airship, and the current strength in the circuit closed being influenced proportionally to the deflection of the switch by altering the resistance in the circuit.

At least four elevator screws are provided, two in the fore part of the airship and two in the rear part, arranged on either side of the longitudinal central vertical plane. The electrical controlling members of the fuel supply pipes are suitably connected with the regulating switches in such a way that when inclinations about the longitudinal axis occur more fuel is supplied to the screws located on the inclined side of the air ship, and when inclinations about the transverse axis occur more fuel is similarly supplied to both the screws located on the inclined side, the speed of revolution of the screws being thereby increased and the horizontal position of the airship recovered. The electrical appliance influencing the controlling valves of the fuel supply pipes may be constructed in a manner known in itself, and for this purpose preferably solenoids or magnets may be employed.

In case of an aeroplane its right or left wings will be affected by my electrical appliances in a similar manner and with similar effect as the lifting propellers of a helicopter.

The altitude of the aircraft will be influenced by increasing or reducing the power of the lifting propellers by electrical appliances, in the case of a helicopter, or the altitude control, in the case of an aeroplane, and the direction and strength of the circuits in such appliances will be controlled by a hermetically closed resilient box responding to the change in density of the surrounding air which again is depending on the height attained by the aircraft.

The electrical circuits influencing the altitude of the aircraft are interconnected with those influencing its horizontal position in such a manner that the altitude controls and horizontal controls may work together on the same adjusting devices without counteracting each other's actions but strengthening the same and all these devices may be fed from one central source of electrical power.

In the drawings:

Fig. 1 is a diagrammatic plan view of a helicopter aircraft;

Figs. 2, 2a and 2b are plan and fractional side views, respectively, of an aeroplane indicated to be equipped with my device;

Fig. 3 is a diagram of the electrical circuits and associated devices for controlling the movements of a helicopter, while Fig. 3a is an enlarged detail diagram of a portion of Fig. 3 showing a portion of my automatic altitude control.

Fig. 4 is a fragmentary diagram of a modification of a portion of the devices shown in Fig. 3.

Figure 3:
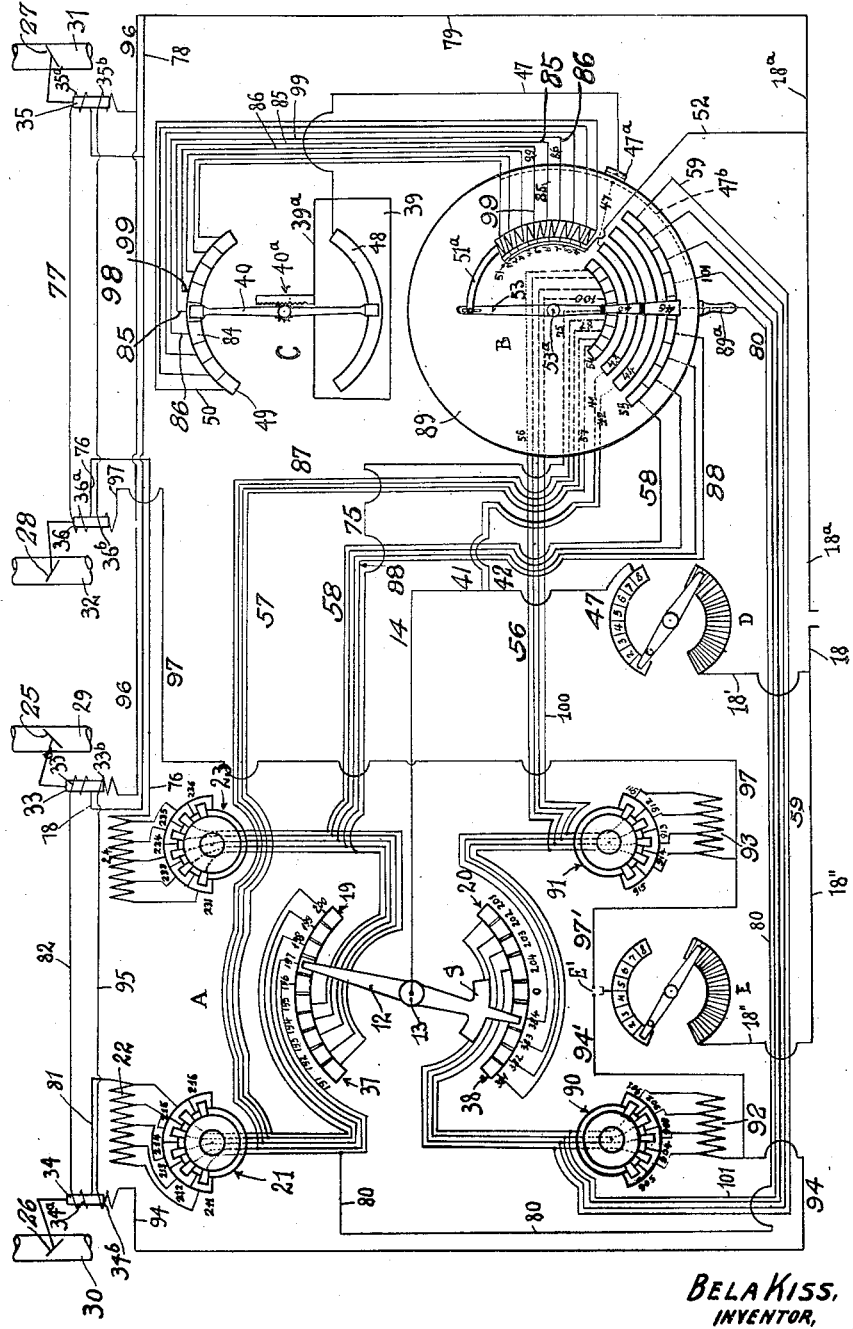

The helicopter shown in Fig. 1 has right and left side motors 1 and 2, operating lifting propellers 3 and 4, and the electrical control devices are built into the feed pipes of these motors. The propellers 5 and 6 serve to propulse the aircraft in a forward or backward direction or to cause its turn in a right hand or left hand direction and are operated by separate motors.

In Fig. 2 I show an aeroplane of the usual construction with its lifting plane 7 and right and left hand control plane sections 8 and 9 directly acting on which are shown my lifting and lowering magnets 34, 35 and 34b and 35a, as will be more fully described hereinafter.

In the detail diagram of Fig. 3 the electrical circuits and portions of the associated devices for a helicopter aircraft are shown which is imagined as having two rows of motors and lifting propellers on each side thereof, the feeding pipes 30 and 29 serving the two rows of motors on the left hand side of the machine, while the pipes 32 and 31 are for the motors on the right side of the helicopter. The diagram indicates the arrangement for counteracting the inclinations of the machine to the right or left, about its longitudinal axis.

A double acting pendulum switch, generally indicated by the letter A. is arranged in a transverse vertical plane of the air craft, and it will be obvious after having become familiar with this device that a similar pendulum switch may be inserted into the machine, with analogous electrical circuits and other devices, in a longitudinal vertical plane of the machine for adjusting it to a horizontal position about its transverse axis, said switch influencing the forward and rearward motors in a similar manner as the pendulum at A will influence the rows of motors on the left hand and right hand sides of the machine.

The lever 12 of the switch is pivoted on shaft 13 and carries a weight S at its lower end so as to act as a pendulum. The lever is made of electroconductive material and is connected to the pole 18 of the source of electrical power by the conductor 18', through switch D and conductors 17 and 14.

The upper end of the lever 12 is sliding on a series of contacts 37—19, while its lower end is similarly engaging another series of contacts 38—20, said ends connecting with the various insulated contacts in said series as the aircraft inclines to the right or left to a smaller or larger degree.

The contacts on the left of the upper series, towards its end 37, are connected, through a switch device 23 to be described hereinafter, to the tappings of a resistance 24 in such a manner that a small deviation of the lever 12 will insert a large resistance into the circuit while its large deviation will have a reverse effect. The circuit will then continue through the device for raising the right hand side of the machine, as will be seen presently.

The right hand side contacts, towards the end 19, of the same series will connect, through a second switch device 21 to the tappings of a second resistance 22 which will influence the lifting devices of the left side of the machine.

The diagram of Fig. 3 shows a construction wherein four rows of lifting propellers are provided in a helicopter style machine and said machine has inclined to the left so that the valves 26 and 25 in the feed pipes 30 and 29 for the left side motors are open wider to increase the fuel flow and power of said motors, while the opposite is happening to the motors on the right hand side, having the valves 28 and 27, and fuel pipes 32 and 31.

Of course, a single row of motors may also be arranged on either side of the machine, and in case of the control switch for the forward and backward inclinations of the machine the valves 26 and 25 may be imagined as influencing the forward motors and the valves 28 and 27 as belonging to the rearward motors.

Similarly, in case of an aeroplane, the respective groups of valves may be imagined as replaced by the left and right hand control portions 9 and 8 of the plane 7 (Fig. 2) and said portions either directly influenced by the electrical devices to be described hereinafter, or intermediate motor power for said portions affected by the said electrical devices.

The valves 26, 25 and 28, 27, are governed by solenoids 34, 33 and 36, 35, respectively, through appropriate link connections, each solenoid perferably has two independent windings 34a, 33a, 36a, 35a and 34b, 33b, 36b, 35b, respectively, the upper ones of which are connected to the contact series 37—19, the lower ones to the series 38—20. The upper windings being energized the respective solenoid cores move in such a direction as to open the valves and strengthen the motors, while the reverse will happen when the lower windings receive increased electrical energy.

Interconnected with this pendulum switch is a barometric registering switch, generally indicated by the letter C and the distributing switch B, being a part of the altitude control mechanisms. In this part of my device a closed air box 39 is provided which may be partly evacuated or which may be filled under higher pressure than that of the atmosphere. An arm 40 is connected to the top 39a of the air box by gears 40a, the upper end of said arm being slidable on insulated contacts 49, while the lower end thereof is slidable on electrical conductor 48 and the movement of said arm will so influence, through appropriate electrical circuits, the mentioned solenoids and feed pipe valves, that a rising or sinking of the aircraft will normally be counteracted, as will be more fully explained hereinafter.

The current for the circuit of the devices C and B is also received from the pole 18 of the source of energy through the conductor 18', switch D, then through conductors 17, 41, rail 43, conductor 47, and rail 48. This circuit is closed by passing the current through the lever 40, a unit in the series of contacts 49, in this case that indicated by the numeral 85, then through the respective section 5 of a multiple solenoid 51 in the device B, and from thereon continued in conductors 52 and 18a and so back to the source of current.

A second circuit for the devices B and C is branching off from the common conductor 17 into a conductor 42 and then into the conductor rail 44. The rails 43 and 44 are further electrically connected by the bridging portions 45 and 46 of the lever 53 of the device B, sliding on said rails, to the respective insulated series of conductors, 54 and 55 by a respective portion of said lever 53 sliding on said series of contacts. These contacts are continued in electrical conductors, as, for instance: 75, 87, 100, and also 58, 88, 89, 101, 59, which are connected to respective portions of the pendulum switch at A so as to influence the actions of the same, as will be hereinafter illustrated.

In case of helicopter machines a further resistance regulating switch E is also added to my device receiving the current from the same pole 18 through the conductor 18'' and through which said current may pass by the conductors 94 and 97' into the lower windings 34b, 33b, 36b, 35b of the solenoids, said switch E being of particular use in executing a quick descent of the machine.

To illustrate the operation of my device I will describe its effect on the air craft in the following cases:

Case 1, starting and rising under even loading in a horizontal position.
Case 2, while in flight, the aircraft inclines to the right.
Case 3, while in flight, the aircraft inclines to the left.
Case 4, while in flight, the aircraft inclines forwardly.
Case 5, while in flight, the aircraft inclines rearwardly.
Case 6, starting and rising under uneven loading inclined to one side.
Case 7, counteracting an undesired rise during flight.
Case 8, counteracting an undesired sinking while in flight.

Case 1. In the first case, when an aircraft is starting and rising under even loading in a horizontal position, the lever 12 of the pendulum device in A is in its vertical central position and the lower end thereof is engaging the central lower unit O thereby disconnecting any of the circuits in the lower series of the contacts 38—20 and disenergizing the lower solenoid windings which when energized would reduce the power of the motors and cause the machine to descend.

The upper end of the lever 12, however, will make contact with a respective part of the upper contact series 37—19 and will establish a circuit starting from pole 18 through the regulating resistances and switch D, then conductors 17, 14, shaft 13, lever 12, contact unit 196, switch 21, unit 211 thereof, the full resistance 22, conductor 81, upper solenoid winding 34a, conductor 82, solenoid winding 33a, conductors 78, 79 and 18a, and so returned to the source of current.

The effect of this circuit will be, as will be obvious, that all the lifting propellers will operate with increased power.

At the same time, however, the current switched in at D will also proceed through the conductors 17, 41, rail 43, bridge portion 45 to a respective unit in the series of contacts 54, then conductor 75' to the mentioned switch 23 in the pendulum group A and through its unit 231, the full resistance 24, conductor 76, solenoid winding 36a, conductor 77, winding 35a, conductors 78, 79 and 18a, and so back to the source of current.

Another circuit similarly located to the one just described will also be established by conductors 17, 42, rail 44, bridging piece 46, a respective unit in the series of conductors 55, then conductor 80, unit 211 of the switch 21 in the group of the pendulum A, resistance 22, conductor 81, winding 34a, conductor 82, winding 33a, conductors 78, 79 18a, and so back to the source of current.

As will be seen, therefore, the last two circuits passing through the device B will have a similar effect to the circuit first described and passing directly through the pendulum A, that is, all these circuits will increase the lifting power of the motors.

A third style of a circuit will, however, also be established at the same time, starting from the switch D, through conductors 17, 41, rail 43, then conductor 47, a sliding contact 47a being interposed between the two parts of the conductor 47, as will be described hereinafter, contact rail 48, arm 40, a respective unit 51 of the contact series 49, conductor 85, a respective unit in the solenoid 51, conductors 52, 18a and so returned to the source of current, as has been pointed out hereinbefore. The effect of all these circuits will be that the regulating valves 26, 25, 28, 27 will be uniformly opened and the lifting motors will operate with uniform strength so that the aircraft will vertically rise.

Through this rise, however, the top 39a of the air box 39 will be influenced by the change in the density of the air, and by the decreased density of the air the top of the air box will be caused to expand and the arm 40 to move in such a manner that it will now connect with its upper end to the conductor 99, said conductor will energize the section 4' of the solenoid series 51—Figs. 3 and 3a—and said unit 4' will draw the core of the solenoid 51 from its former position in unit 5' into a position within unit 4' whereby the upper part of the arm 53 of the device B will be moved in a left hand direction, being rockable on the shaft 53a and being connected in a suitable manner by link mechanism to the arm 51a of the moving solenoid core 51b.

In this position the lower portion of the arm 53 will connect the respective series of contacts with the conductors 100 and 101. Said conductors will now lead the current into the respective lower switches 90 and 91 of the group of pendulum A and the units 901 and 911 thereof, through the resistances 92 and 93, and then through the conductors 94 and 97 into the solenoid units 34b and 33b, 36b and 35b and then return through conductors 96, 79 and 18a. The effect of the circuits just described and now passing through the device B would then be to counteract the increase in the power of the motors, throttle them down and return the aircraft into its starting altitude.

To counteract this effect of the bridging of the conductors 100 and 101 in the device B, I arrange the rails and contact series 43, 44 and 54 and 55 on a disk 89 rotatable around a shaft 53a and having a grip or handle 89a by which said disk may be turned in a right hand direction until again the conductors 80 and 75 will be connected in the series of current of the arm 53 held in its position by the solenoid unit 4'. This operation is continued as long as it is desired to rise and when the altitude aimed at is attained by the air craft the distributing device B may be left alone and the machine will remain in that altitude.

It is obvious that the series of solenoids 51 are independent to the disk 89 and are secured in a stationary manner, said disk also will have an electroconductive portion 47b on which the sliding contact 47a may operate, while the disk is turned.

Case 2. A second situation in the operation of the aircraft is when it will start to incline to the right side while in flight. In this case the upper end of the arm 12 in the pendulum group A will connect with the unit 194 on its upper series of contacts and with the unit 204 in its lower series.

There will be established a first circuit as follows: D, 17, 14, 13, 12, 194, switch 23 (unit 233) resistance 24, conductor 76, winding 36a, conductor 77, unit 35a, and conductors 78, 79, 18a. And also: D, 17, 14, 13, 12, 204 lower switch 90, unit 901 thereof, resistance 92, conductor 94, winding 34b, conductor 95, winding 33b, conductor 96, 79, 18a.

The result, therefore, will be a raising of the right side and lowering of the left side of the machine.

The circuits through B and C and their results will be similar to those described in connection with Case 1, with the difference however that the resistance 92 of the switch 90 being weaker, a stronger current will pass through windings 34b and 33b than through windings 34a and 33a and the valves 25 and 26 will be closed to a certain degree so that their motors will operate in a weaker manner than the motors of the valves 28 and 27.

So, while the devices of B and C will operate to adjust the altitude as has been explained hereinbefore, they at the same time will also allow the machine to regain its horizontal equilibrium.

After the machine returns to its horizontal position the situation will be like in Case 1, and 34b and 35b will cease to operate.

Case 3. If the machine inclines to the left while flying, the arm 12 of switch A contacts with upper unit 197 and lower unit 384 and the following circuits result: D, 17, 14, 13, 12, 197, switch 21, switch unit 212, resistance 22, 81, winding 34a, 82, 33a, 78, 79, 18a; and also: D, 17, 14, 13, 12, 384, 91, (911), 93, 97, 36b, 98, 35b, 96, 79, 18a.

The circuits of B and C will again be similar to those in Case 1, only in a reverse manner, on the opposite sides. The solenoids will operate in a reverse manner to Case 2, while B and C will control the altitude of the machine.

Case 4. When while flying the machine inclines to a forward direction, a second pendulum switch system exactly identical with the one herein described but arranged in a vertical longitudinal plane of the machine.

will act on its own separate solenoids influencing the forward and rearward motors in opposite manners. Operation and effects are entirely identical to those described in Cases 2 and 3 only applied to inclinations about a transverse axis of the machine, as will be understood.

Case 5. When the machine inclines rearwardly, the situation is similar to that of Case 4, except the action will be in an opposite direction.

Case 6. Starting under uneven loading, machine inclined to one side. This original situation may be remedied through my invention by making the lifting circuits on the respective side permanently stronger than on the other side by judicious manipulation of the switches 21, 23, 90 and 91. Each of these switches has as many stationary contacts as there are tappings on the respective resistances and they also have movable contacts on rotatable inner wheels, as will be understood by those versed in this art.

So, for instance, switch 21 has five contacts on its wheel connected on the one side with the sections 196, 197, 198, 199 and 200 of the series 37—19 of pendulum switch A, and on the other side and in a sliding manner with the stationary tappings 211, 212, 213, 214, 215, 216 of the resistance 22. If we now move the wheel of switch 21 with one contact in the direction of the pointers of a clock, then the first tapping of the resistance 22 will be permanently eliminated and windings 34a and 33a will receive stronger currents than the similar windings on the other side of the machine. Continuing the reduction of the resistance on the left hand side of the engine we may bring the machine to an even keel. The same holds good for the case the machine is permanently inclined to the right hand side.

Case 7. Eliminating undesired rise while flying. Suppose that in a situation like Case 1, after the desired height is obtained, the machine is still climbing, then the following circuits will be produced by and in my device: Two first circuits through A as in Case 1; a third circuit: D, 17, 41, 43, 47, 48, 40, 99, section 4' of solenoid 51, 52, 18a; a fourth circuit: D, 17, 41, 43, 45, 100, switch 91, unit 911, 93, 97, 36b, 98, 35b, 96, 79, 18a; a fifth circuit: D, 17, 42, 44, 46, 101, switch 90, unit 901, resistances 92, 94, 34b, 95, 33b, 96, 79, 18a. It follows that the operating windings 34a, 33a, 36a, 35a will lose strength against the windings 34b, 33b, 36b and 35b the latter having greater strength, so that all the valves will close more than they were closed before and all the motors and propellers will operate with a reduced speed, therefore the machine will return to the original altitude.

Case 8. Counteracting an undesired sinking during the flight of the machine. The machine being in the position of Case 1 and starting to lose altitude, the first two circuits of Case 1 through group A will be intact, but the following other circuits will be established: D, 17, 41, 48, 47, 48, 40, 84, 86, section 6' of solenoids 51, 52, 18a; also: D, 17, 41, 43, 45, 87, switch 21, unit 212, resistances 22, 34a, 82, 33a, 78, 79, 18a; further: D, 17, 42, 44, 46, 88, 23, (233), 24, 76, 36a, 77, 35a, 78, 79, 18a.

It will be seen that in this case the windings 34a, 33a, 36a, and 35a, which have been in operation, will receive a strengthened current, ultimately causing a rise of the machine.

From the foregoing it also will be obvious that if three movements of the machine are to be remedied simultaneously, like inclinations to the right side, forward and an undue rising of the machine, or any combination of the three kinds of movements, my invention can automatically take care of all the three without the control of one adversely influencing that of another one.

The intensity of all these controls will be regulated through the setting of the switch D which has a series of regulating resistances therein. In a similar manner individual switches 21, 23, 90, and 91 also may be set influencing the devices following them.

In case it is desired to raise or lower the machine to another altitude, switch D will be set for stronger or weaker current.

In case of descent the switch E also is to be used, gradually strengthening the current therethrough while reducing that passing through the switch D. A double acting cut-off switch E' is joined to switch E, the current branching off therefrom into lines 94' and 97' then to join lines 94 and 97, described hereinbefore, into which the lowering solenoids 34b, 33b, 36b and 35b are inserted. Switch E' is normally open.

In Fig. 3a solenoid 51 of the distributing switch B and the adjacent parts thereof are shown in a diagrammatic manner, but on a larger scale, bar 51' leads the current from the individual solenoid sections 1' to 9', into the conductor 52.

In Figure 4 such a modified arrangement is shown of the device B that the disk 89 will automatically turn to prevent the descent of the machine while its rise is desired, as has been described for hand operation in connection with Case 1.

In this figure C indicates the barometric electrical control box and 89 is the rotatable disk of the device B. From the conductors leading from C to the sections of solenoid 51, as 85, 86, 99, branches 85', 86', 99' etc, are led to a second stationary sectional solenoid group F the individual section 1'' to 9'' being connected through bar f and conductor 52', into the return conductor 18a.

The circuit which comes from C to solenoids 51 will also feed solenoids F and with an identical strength, and the core f' of the latter pivotally connected by link arm f'' and post G to the disk 89, will cause said disk to turn to a similar extent as the arm 53 will be turned by the solenoid 51. This way the disk will automatically follow the arm and the machine keeps on rising. When the desired altitude is reached, a switch X is broken and the disk operating solenoid F cutoff from the source of current so that the machine will automatically return to the set height. When descending, the switch X is again closed and disk 89 returns to zero altitude.

The operation of my device in connection with aeroplanes is entirely identical with that herein described for helicopters, with the difference, as noted hereinabove, that auxiliary plane sections 8 and 9, respectively, altitude control 10, will be influenced by the respective solenoids.

It is understood that changes and variations may be made in the different parts and combinations of my invention and I hereby reserve my rights to any and all changes and modifications which are within the spirit of the invention and the scope of the annexed claims.

What I claim as new, is:

1. In an aircraft, having means to independently raise any side of the same, means to automatically return the air craft into a normal horizontal position, said means including a gravity pendulum arranged in a vertical plane transverse to the axis of the aircraft around which the horizontal equilibrium is desired to be re-established, said pendulum being rotatable around an axis intermediate of its length; a series of upper and a series of lower contacts being in successive electroconductive relation with the upper and lower ends of said pendulum, respectively, when the same are passing over them; electrical circuits conducted to the left-hand and right-hand side contacts in both of the series; resistances in said circuits gradually decreasing in the circuits further away from the vertical central line of said series of contacts; electrical devices in said circuits adapted to influence the means to raise the respective sides of the air-craft in such a manner as to simultaneously increase the lifting power of said means on the side of air craft which is lower than the normal horizontal position thereof and decrease said power on the side that is higher than its normal position, when said pendulum is caused to deviate from its center vertical position; and a source of current to complete said circuits through said pendulum and through said devices.

2. In an aircraft stabilizing device as set forth in claim 1, said means to raise a side of the air craft consisting of lifting screws driven by independent motors, and the devices to influence their power consisting of electromagnets acting upon the power control elements of said motors.

3. In an aircraft stabilizing device as set forth in claim 1, said means to raise a side of the aircraft consisting of lifting screws driven by independent motors, and the devices to influence their power consisting of electromagnets acting upon the power control elements of said motors; the right hand upper contacts in said series establishing circuits adapted to increase the power of the motors on the left side of the aircraft, and vice versa, and the left side lower contacts in said series establishing circuits adapted to decrease the power of the motors on the right side of the air craft, and vice versa.

4. In an aircraft stabilizing device as set forth in claim 1, said means to raise a side of the aircraft consisting of lifting screws driven by independent motors, and the devices to influence their power consisting of electromagnets acting upon the power control elements of said motors; the right hand upper contacts in said series establishing circuits adapted to increase the power of the motors on the left side of the aircraft, and vice versa, and the left side lower contacts in said series establishing circuits adapted to decrease the power of the motors on the right side of the aircraft, and vice versa; and the upper adjacent central contacts in said series being adapted to establish circuits giving substantially uniform power to the motors on the both sides of said aircraft.

5. In an aircraft stabilizing device as set forth in claim 1, said means to raise a side of the aircraft consisting of lifting screws driven by independent motors, and the devices to influence their power consisting of electromagnets acting upon the power control elements of said motors; the right hand upper contacts in said series establishing circuits adapted to increase the power of the motors on the left side of the aircraft, and vice versa, and the left side lower contacts in said series establishing circuits adapted to decrease the power of the motors on the right ride of the air craft, and vice versa; the upper adjacent central contacts in said series being adapted to establish circuits giving substantially uniform power to the motors on the both sides of said aircraft, and a first switch device with regulating resistances therein adapted to control the strength of the current passing through said series of contacts.

6. In an aircraft stabilizing device as set forth in claim 1, said means to raise a side of the air craft consisting of lifting screws driven by independent motors, and the devices to influence their power consisting of electromagnets acting upon the power control elements of said motors; a first series of electromagnets adapted to increase the power of said motors, and a second series of electromagnets adapted to decrease the power of said motors, a first switch device with regulating resistances therein adapted to control the strength of the current passing through said series of contacts, and a second switch device with regulating resistances therein adapted to gradually and directly pass the current from said source through said second series of electromagnets when so desired and thereby cause the aircraft to descend in a controlled manner.

7. In an aircraft, an altitude regulator, comprising a resilient membrane reacting to the variations in the air surrounding the same; a rotatable electroconductive lever acted upon by the movements of said membrane in such a manner that at normal atmospheric pressure, said lever is in a central position, deviating therefrom to right or left as the pressure of the air decreases or increases; a series of electrical terminals in successive contact with said lever as the same is deviating from its central position; a series of circuits connected to said terminals, each having an electrical solenoid therein; a common movable core for all said solenoids; a rotatable electroconductive arm acted upon by said core, normally being in a central position and being adapted to deviate therefrom; a source of electrical current establishing said circuits through said lever and said solenoids, whereby the successive energizing of the solenoids will cause said arm to deviate to the right or left; a series of electrical contacts being arranged on a rotatable disk independent of said arm and adapted to be successively connected in pairs by said arm; a series of electrical circuits connected to pairs on said contacts; lifting screws for said aircraft being driven by suitable motors; electrical devices to influence the power of said motors, said devices being inserted in said circuits closable by said rotatable arm; a source of current, and electrical conductors and resistances connected thereto, whereby a deviation of said arm caused by a change in the air pressure, as described, will close gradually stronger circuits adapted to reduce the power of said motors with gradually increasing intensity, or vice versa, the normal central position of said arm causing said motors to operate with substantially uniform medium powers, and said disk being rotatable to re-establish such relatively center position at any time desired.

8. In an altitude regulator for air craft, as set forth in claim 7, a link member connected to said disk, a second series of solenoids, with a common core, fed from the same circuits as the first series of solenoids, the core of said second solenoids being connected to said link member whereby said disk will be automatically moved to said center position in relation to said arm.

9. In an aircraft stabilizing device as set forth in claim 1, said means to raise a side of the aircraft consisting of lifting screws driven by independent motors, and the devices to influence their power consisting of electromagnets acting upon the power control elements of said motors; the right hand upper contacts in said series establishing circuits adapted to increase the power of the motors on the left side of the air craft, and vice versa, and the left side lower contacts in said series establishing circuits adapted to decrease the power of the motors on the right side of the air craft, and vice versa; an altitude regulator comprising a resilient membrane, reacting to the variation in the air surrounding the same; a rotatable electroconductive lever acted upon by the variations of the said membrane in such a manner that at normal atmospheric pressure said lever is in a central position deviating therefrom to the right or left as the pressure of the air changes; a series of electrical terminals in successive contact with said lever of the membrane as the same is deviating to the left or right; a series of electrical circuits connected to said terminals each having an electrical solenoid therein; a common movable core for all said solenoids; a rotatable electroconductive arm acted upon by said core normally being in a central position; a source of electrical current establishing said circuits through said lever of the membrane and said solenoids connected thereto, whereby the successive energizing of said solenoids will cause said arm to deviate to the right or left; a series of electrical contacts arranged on a rotatable disk concentrically with the axis, but independent of said arm, said contacts being adapted to be successively connected in pairs by said arm; a series of electrical circuits connected to said pairs of contacts, said circuits being interconnected with said upper and lower circuits of said pendulum in such a manner that a deviation of said arm caused by a change in the air pressure, as described, will close gradually stronger circuits adapted to reduce the power of said motors with gradually increasing intensity, or vice versa, the normal center position of said arm causing said motors to operate with substantially equal medium powers, the said disk being rotatable to re-establish said center position between the arm and the disk at any time desired.

Signed at New York, in the county of New York, and State of New York, this 27th day of September, 1929.

BÉLA KISS.